United States Patent Office 2,972,676
Patented Feb. 21, 1961

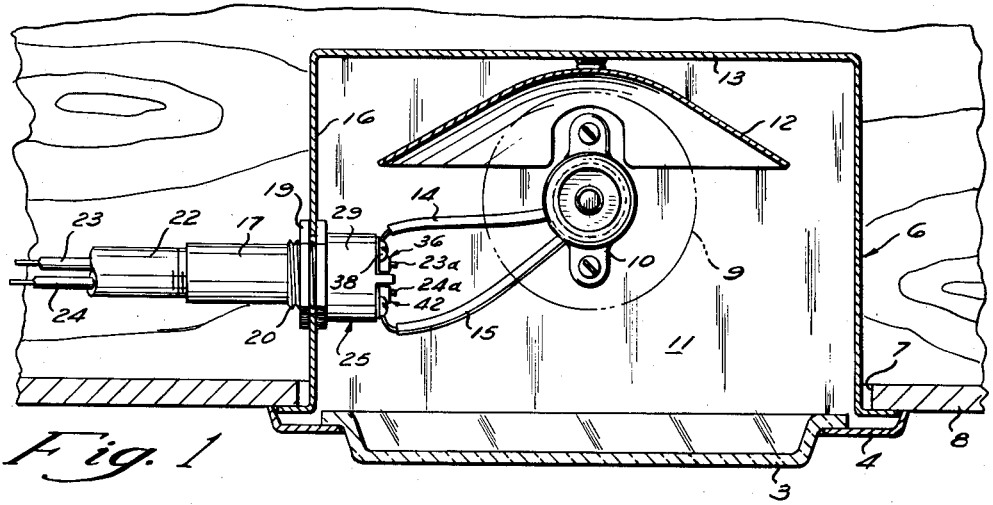
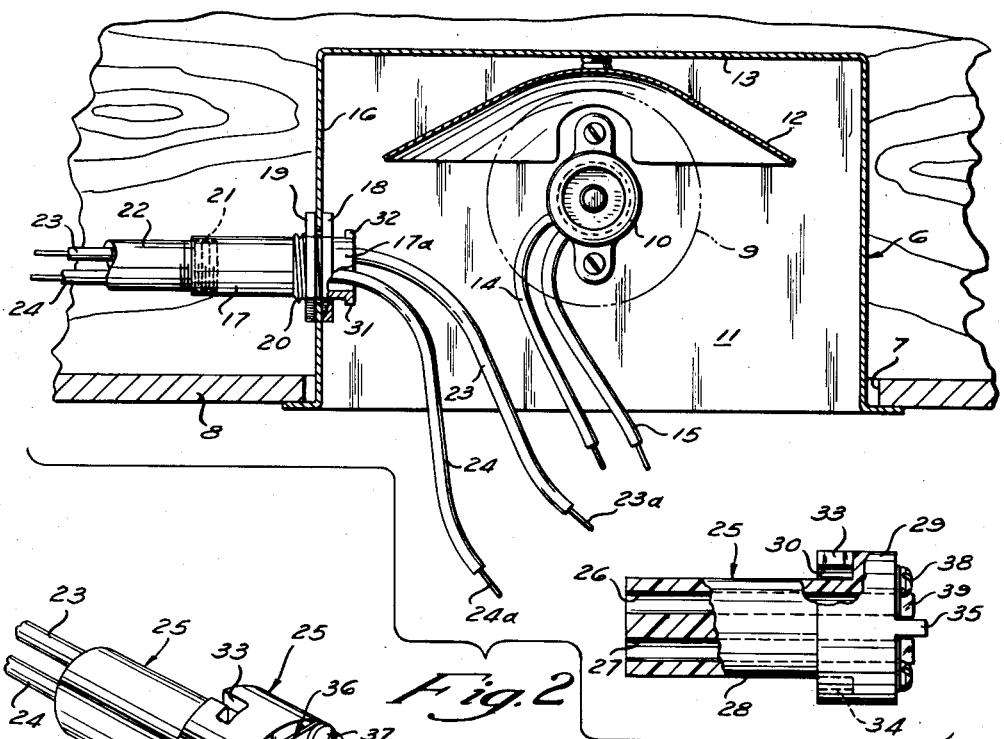
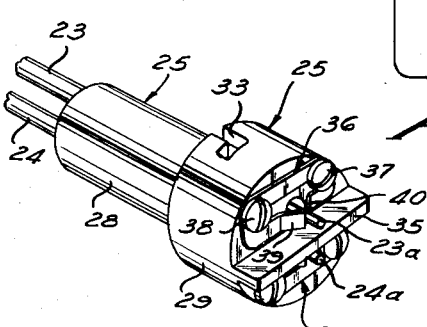
INVENTOR.
CARL M. MOSER
BY
RICHEY, McNENNY & FARRINGTON
ATTORNEYS

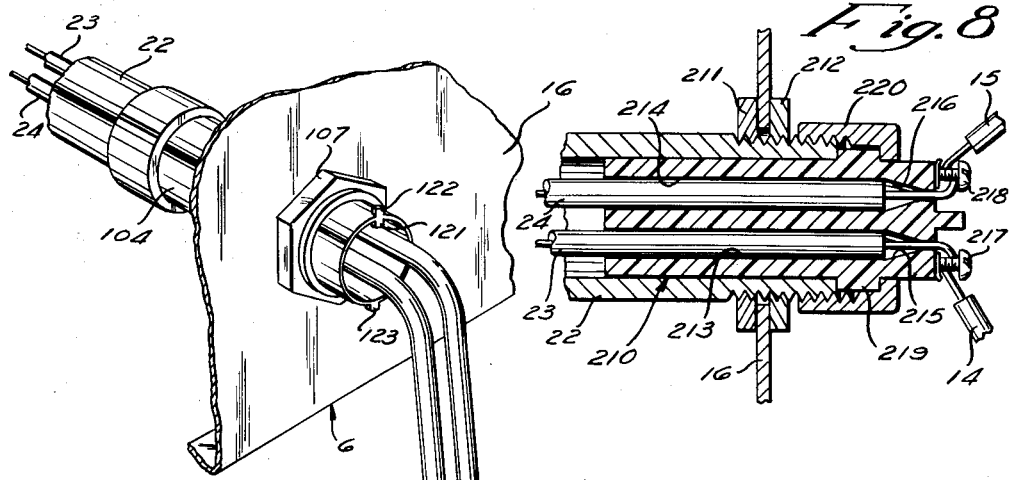

2,972,676
RECESSED LIGHTING FIXTURE

Carl M. Moser, Parma Heights, Ohio, assignor to John C. Virden Company, Cleveland, Ohio, a corporation of Ohio Filed Apr. 29, 1959, Ser. No. 809,723

12 Claims. (Cl. 240—78)

This invention relates to recessed lighting fixtures and more particularly to a recess box and the mounting therein of an insulating structure which will facilitate the wiring of the light carried by the box and a construction that will provide safety features in the wiring and provide other improvements in accessibility over the prior art devices.

The conventional recessed lighting fixture usually comprises a housing or box with a removable glass diffuser element and wherein the box or housing is arranged to be recessed into a wall or ceiling. The mounting of the box for the lighting fixture within the wall or ceiling complicates the wiring to the light or fixture inasmuch as a part of the wiring is concealed and inaccessible except through the opening covered by the glass diffuser. It is also a characteristic of the recessed lighting fixtures that high temperatures occur therein and it is desirable to arrange the wiring to protect parts of the wiring from the adverse effects of the high temperatures. A conventional installation of recessed lighting fixtures involves the use of a junction box mounted on the exterior of the light box, connecting the house wiring system into the junction box and then leading wires covered with asbestos insulation from the lamp socket into the junction box.

It is an object of my invention to provide a recessed lighting fixture which is constructed and arranged so as to eliminate the need for a junction box.

It is a further object of my invention to provide a recessed lighting fixture according to the preceding object wherein such fixture includes a light box and the wires from the house wiring system are led into the light box by means protecting such wires from the high temperatures occurring in the light box.

It is a further object of my invention to provide a recessed lighting fixture according to the preceding objects wherein the light box is provided with a tubular member to receive the house wiring and said tubular member is constructed and arranged to receive an insulating body to surround and protect the wires of the house wiring system as they enter the light box.

It is a further object of my invention to provide a recessed lighting fixture according to the preceding objects which will comply with the underwriter's safety requirements and which will facilitate the rapid and convenient installation of the lighting fixture.

Further objects and advantages relating to economy in manufacture, safety in construction and use and long and trouble-free life will appear from the following description and the appended drawings wherein:

Fig. 1 is a sectional view showing the lighting fixture of my invention as mounted in a ceiling;

Fig. 2 is an exploded view partly in section showing the light box mounted in the ceiling and the wires to be connected by means of an insulator body;

Fig. 3 is a perspective view of the insulator body shown in Fig. 2 with the house wires attached to the insulator body;

Fig. 4 is a perspective showing with parts broken away of a modified form of my invention;

Fig. 5 is an elevation showing the device of Fig. 4 in its assembled condition;

Fig. 6 is an enlarged sectional showing taken as indicated at 6—6 of Fig. 5;

Fig. 7 is a perspective showing of the clip for receiving the house wires in the form of device shown in Figs. 4–6; and Fig. 8 is a sectional view of a modified form of the invention.

It is an important feature of my invention that the house wires are led into the light box in a manner so that the electrician may connect an insulating or protective body to the house wires and mount the insulating body in a tube in the wall of the light box in a manner such that the house wires are protected from the high temperatures occurring in the box.

It is also a characteristic of my invention that the wires leading from the light socket and the house wires are brought into a position conveniently assessible for the electrician.

Referring to the drawings, the lighting fixture comprises a metal light box 6 which is mounted through an opening 7 in the ceiling 8. Preferably the box is provided with a light diffuser glass panel 3 carried in a hinged or removable frame 4. The box is generally rectangular and of a depth to safely enclose the light bulb 9 carried by lamp socket 10 mounted on a wall 11 of the light box 6. Preferably a reflector 12 is secured to the top wall 13 of the box 6. The wires 14 and 15 connected to the lamp socket 10 are subjected to the high temperature resulting from the light bulb 9 and are preferably covered with asbestos or other heat resisting insulation material. The side walls of the light box 6 are provided with the usual punch-out sections for providing apertures in the walls of the box. One such aperture is provided in the side wall 16 and a metal sleeve 17 is mounted in this aperture.

The sleeve or tubular member 17 is characterized by an integral flange 18 which bears against the inner face of the wall 16 around the aperture in the wall. A nut 19 is drawn up along the exterior threads 20 on the sleeve 17 so that the sleeve is securely clamped to the light box 6. The assembly of the sleeve 17 in the light box 6 is made before the box is installed within the opening 7 in the ceiling. The end of the sleeve as at 21 is preferably interiorly threaded to receive the threads on the metal conduit 22 carrying the house wires 23 and 24. The flange 18 is located near one end of the sleeve 17 so that the major portion of the sleeve 17 is supported exteriorly of the box and the minor portion of the sleeve 17 projects within the box. The house wires 23 and 24 are proportioned so that they may be pulled into the box 6 when the box is installed in the ceiling as illustrated in Fig. 2.

To connect the light fixture the house wires 23 and 24 are pushed into an insulating body indicated in its entirety as at 25. The body 25 is provided with an axial bore 26 adapted to receive the house wire 23 including the insulation on the wire 23. Prior to insertion of the house wire 23 into the bore 26, the insulation is stripped at the end as indicated at 23a. The body 25 is also provided with an axial bore 27 parallel to the bore 26. The bore 27 is proportioned as the bore 26 to receive the house wire 24 which has the end thereof stripped as at 24a.

The body 25 includes a cylindrical shank portion 28 and an enlarged cylindrical head portion 29. The shank portion 28 has a diameter such that it will fit snugly within the metal sleeve 17 carried by the wall of the light box. The head portion 29 of the insulating body 25 is provided with a flange 30 proportioned to fit over that part of the sleeve 17 at the interior of the light box indicated at 17a. The portion of the metal sleeve as at 17a is provided with oppositely extending lugs 31 and 32 adapted to be received by bayonet slots 33 and 34 formed in the flange 30 of the head portion 29. The end face of the insulating body 25 is provided with a partition wall 35 and at one side of the wall 35 a clip 36 is mounted by means of the headed fasteners 37 and 38. The clip 36 includes the resilient portions 39 and 40 which operate to grip the stripped end 23a of the wire 23. This is accomplished by the electrician grasping the wire 23 and pushing it through the bore 26 until the stripped end of the wire spreads the resilient members 39 and 40 apart and is exposed as illustrated in Fig. 3. The sharp, knife-like edges of the portions 39 and 40 bite into the wire and prevent withdrawal of the wire 23 from the insulating body 25. A similarly constructed clip 42 is mounted at the other side of the partition wall 35. The clip 42 is provided with resilient portions similar to 39 and 40 so as to grip the stripped end 24a of the wire 24.

After the wires 23 and 24 are attached to the body 25, the electrician secures the asbestos covered wire 14 by soldering the same to the clip 36. The wire 14 may also be secured to the clip 36 by means of the headed fasteners 37 or 38 used to mount the clip on the insulating body. Similarly the asbestos covered wire 15 is secured to the lower clip 42.

The insulating body 25 having the wires 23, 24 and 14 and 15 connected thereto is then pushed into the metal sleeve 17 mounted in the light box wall. This is accomplished by pushing the wires 23 and 24 back into the conduit 22 and when the cylindrical portion 28 of the insulating body is fully within the sleeve 17, the body 25 is rotated so that the lugs 31 and 32 are locked within the bayonet slots 33 and 34. The insulating body 25 is preferably molded of Bakelite, polyester resin, or other plastic material which will resist the high temperatures occurring in the light box. The wires 23 and 24 are separately housed within the bores 26 and 27 so that even if the covering on such wires should be charred or otherwise adversely affected by the high temperatures, they will remain insulated with respect to each other.

The construction is particularly suited for rapid and convenient installation. When the box 6 is installed in the ceiling, the conduit 22 is connected to the member 17 and the wires 23 and 24 pulled down into the box about as shown in Fig. 2. It will be understood that flexible metallic cable, popularly known as "BX cable," may be used in place of the conduit 22. It will also be understood that flexible, loom covered wire, or two-wire "Romex-cable" may be connected to the tubular member 17 with conventional fittings. Thereafter, to complete the connection to the lamp socket, the wires 23 and 24 are pushed through the bores 26 and 27 in the insulating body 25. This may be conveniently accomplished inasmuch as the wires 23 and 24 are proportioned to hang down beneath the box 6 as shown in Fig. 2. The wires 14 and 15, which are insulated with asbestos or the like, are then connected to the clips 36 and 42 and the insulating body pushed into the tubular member 17 and rotated so as to lock by means of the bayonet slots.

In that form of my invention illustrated in Figs. 4 to 7, the insulating body is formed in two separable parts and is constructed and arranged so that the circuit through the lamp may be completed only when the two sections are assembled with the box. As illustrated in Fig. 4 the side wall 16 of the box 6 is provided with an aperture in which is mounted a metal tubular member 104. The major portion of the metal member 104 is exposed at the exterior of the box 6 and the extreme outer end thereof is interiorly threaded as at 105 to receive the house wiring conduit 22. A flange 106 is integrally formed on the member 104 and bears against the outer face of the wall 16. A clamping nut 107 bearing against the inner face of the wall 16 is drawn up along the threads 108 formed on the minor portion of the member 104 which projects within the box 6.

As in the preferred embodiment, an insulating body 110 is provided with a pair of spaced axial bores 111 and 112. As in the preferred embodiment one bore, namely 111, receives the house wire 23 and the bare end portion thereof as at 23a is received between the prongs 114 and 115 of a clip 113. A similar clip 117 is arranged in alignment with the bore 112 to receive the bare end 24a of the wire 24. Lateral inspection openings 118 and 119 are formed in the insulating body 110 so that the electrician using the fixture may observe when the bare end of the wire is securely gripped by the prongs on the clip.

The construction of the clip 113 for gripping the wire is illustrated in detail in Fig. 7. Each of the clips 113 and 117 include a horizontally extending portion as indicated at 113a and a frictional gripping portion indicated at 113b. The clips are frictionally gripped to the insulating body 110 by sliding the clips laterally into grooves parallel to the bores 111 and 112 so that the wire gripping portions 114 and 115 extend into the bore 111 and the portion 113b bears against the outer end face of the body 110.

The insulating body 110 is provided with a longitudinal groove 120 which locks the insulating body against rotation relative to the tubular member 104. The minor portion of the tubular member 104 which projects into the box is provided with a lug 121 which rides in the groove 120 when the insulating body is pushed axially into the member 104. This portion of the tubular member 104 is also provided with oppositely extending lugs 122 and 123 to fit into bayonet slots 124 and 125 formed in the cap member 126.

The insulating body 110 includes a shank section 129 which fits snugly within the tubular member 104 and a head section indicated at 130 which has an outer diameter corresponding to the outer diameter of the tubular member 104 at the interior of the box. An insulating cap section 126 is proportioned to fit snugly around the head section 130 of the insulating member and similarly around the end of the tubular member 104 disposed within the box. A pair of spaced metal rivets 131 and 132 are fixed in the end of the cap section 126. The heads of the rivets 131 and 132 are arranged to be brought into contact with the ends 113c of the clips 113 and 117. This electrical contact occurs only when the bayonet slots in the cap are in locked position. Accordingly the cap functions as a switch which is closed only when the cap locks the insulating body 110 in the sleeve 104.

The method of assembly in this form of my invention is similar to that employed in connection with the embodiment first described. The house wires 23 and 24 are pushed axially through the insulating body 110 until the bare ends of the wires 23 and 24 are securely gripped by the spring clips 113 and 117. The body 110 is then moved axially into the tube 104 by aligning the lug 121 with the groove 120 in the body 110. The lamp socket wires 14 and 15 are then soldered to the exposed end of the rivets 131 and 132, respectively. The circuit is then completed by sliding the cap section 126 onto the head section of the member 110 and turning the cap section to lock the bayonet slots on the lugs 122 and 123.

It will be understood from the mode of operation employed in connection with the assembly of the embodiment of Figs. 4 to 7 that the circuit to the lamp socket cannot be completed until the cap section 126 is locked to the tubular section 104 carried by the wall 16. It will also be understood that with this form of the invention the bores 111 and 112 through the insulating body are protected from the heat in the box by the insulating cap 126.

In that form of the invention illustrated in Fig. 8, the house wiring conduit 22 is utilized as a holder for the insulating body 210. The conduit 22 is mounted in an opening in the wall 16 by the light box by means of the clamping nuts 211 and 212. The insulating body 210 is provided with axial bores 213 and 214 to receive the house wires 23 and 24, respectively. The bores 213 and 214 terminate near the end face of the body 210 and the terminal portion is conical as at 215 and 216. The bare end portions of the wires 23 and 24 are guided outwardly through the funnel-like exit and are secured to binding posts 217 and 218. The head of the insulating body includes a shoulder 219 which serves as an abutment for the flange of the clamping nut 220 threaded onto the conduit 22.

This form of Fig. 8 is suited for use with metal conduits and the method of assembly is similar to that used with the other forms of the invention. The house wires are pushed into the insulating body and connected to the binding posts 217 and 218. The asbestos covered lamp socket wires 14 and 15 are also connected to the binding posts 217 and 218. The shank of the insulating body is then pushed into the open end of the conduit 22 and the clamping nut 220 is drawn up.

Although I have shown and described three forms of my invention in considerable detail, numerous modifications may be made therein without departing from the scope of the invention as defined in the following claims.

What is claimed is:

1. In a recessed lighting fixture, a light box, said box having side walls, one of said side walls having an opening therein, a tubular member mounted in said opening, a light socket and a pair of wires connected to the socket mounted within said box, said tubular member having the major portion thereof projecting exteriorly of the box and a minor portion thereof projecting into the interior of the box, an insulating body having a shank and head sections, said shank section proportioned to substantially fill said tubular member, said head section extending into the interior of said box beyond said tubular member inter-engaging locking means on said head section and the minor portion of said tubular member, said insulating body having spaced parallel bores throughout its length to receive a pair of house wires, means on said head section connecting said house wires to said light socket wires.

2. In a recessed lighting fixture, a light box, said box having side walls, one of said side walls having an opening therein, a tubular member mounted in said opening, a lamp socket mounted within said box, asbestos covered wires connected to said lamp socket, said tubular member projecting exteriorly of the box and a portion thereof projecting into the interior of the box, an insulating body having a shank and head sections, said shank section proportioned to substantially fill said tubular member, said head section extending into the interior of said box inter-engaging locking means on said head section and that portion of said tubular member projecting within said box, said insulating body having spaced parallel bores throughout its length to receive a pair of house wires and means on said head section connecting said house wires to said lamp socket wires.

3. In a recessed lighting fixture, a light box having a wall, said wall having an opening therein, a tubular member mounted in said opening, said tubular member having the major portion thereof projecting exteriorly of the box and a minor portion thereof disposed within the box, a light socket mounted in said box, said light socket having a pair of wires connected thereto, an insulating body proportioned to substantially fill said tubular member, said body having spaced axial bores therein to receive house wires, clips mounted on that portion of said body disposed within the box to receive and hold the end portion of said house wires, and means to connect said light socket wires to said clips, and means to lock said body to said tubular member.

4. In a recessed lighting fixture, a light box having a wall, said wall having an opening therein, a round tubular metal member mounted in said opening, said tubular member having a portion thereof disposed within the box, a light socket mounted in said box, said light socket having a pair of asbestos covered wires connected thereto, an insulating body having a portion within said box and having a cylindrical shank portion extending into said tubular member, said body having spaced axial bores therein to receive house wires, clips mounted on that portion of said body disposed within the box to receive and hold the end portion of said house wires, and means to connect said socket wires to said clips, and means to lock said body to said tubular member.

5. In a recessed lighting fixture, a box having a wall, said wall having a circular opening, a cylindrical metal member mounted in said opening, said metal member being secured to the wall at said opening to support the major portion of said metal member exteriorly of the box and a minor portion of the tubular member is supported within said box, means to connect that end of the metal member exterior of the box to a house wiring conduit, a pair of house wires in said conduit, an insulating body having a shank portion and a head portion, said shank portion being cylindrical and proportioned to fit within said cylindrical metal member mounted on the box, said insulating body having a pair of axial bores therein to receive said house wires, said head portion of the insulating body having a flange thereon adapted to surround that portion of the cylindrical metal member disposed within the box, means to interlock said head portion and said cylindrical metal member, said head portion having a separating wall formed thereon between said axial bores, a clip mounted on said head portion at each side of said separating wall, said clip having means formed thereon to grip the ends of said house wires, and means on the head portion of said insulating member to secure said lamp socket wires to said clips.

6. In a recessed lighting fixture, a box having a wall, said wall having a circular opening, a cylindrical metal member mounted in said opening, said metal member being secured to the wall at said opening to support a minor portion of the tubular member within said box, a pair of house wires in said metal member, an insulating body having a shank portion and a head portion, said shank portion being cylindrical and proportioned to fit within said cylindrical metal member mounted on the box, a pair of spaced axial bores through said insulating body to receive said house wires, said head portion of the insulating body having a flange thereon adapted to surround that portion of the cylindrical metal member disposed within the box, means to interlock said head portion and said cylindrical metal member, said head portion having a separating wall formed thereon between said axial bores, a clip mounted on said head portion at each side of said separating wall, said clip having means thereon to grip the ends of said housing wires, and means on the head portion of said insulating member to secure said lamp socket wires to said clips.

7. In a recessed lighting fixture, a box having a wall, said wall having an opening, a tubular sleeve secured to said wall in said opening, said tubular sleeve having the major portion thereof extending exteriorly of the box and a minor portion thereof projecting within said box, an insulating body extending axially within said tubular member, interlocking means on said tubular member and said body to prevent rotation of the body, said body having a pair of spaced axial bores therein to receive house wires, said body having a head portion thereon disposed within said box, said head portion having a clip projecting into each of said bores to grip the ends of the house wires disposed therein, an insulating cap section proportioned to fit around said head portion of said body, a lamp socket mounted in said box having a pair of wires connected thereto, a pair of spaced metal members fixed in said cap section and adapted to be aligned with said clips and bear against said clips, said lamp socket wires being connected to said metal members carried by the cap, and bayonet slot means to lock said cap to the head portion of said body and to said tubular member.

8. In a recessed lighting fixture, a box having a wall, said wall having an opening, a tubular sleeve secured to said wall in said opening, said tubular sleeve having the major portion thereof extending exteriorly of the box and a minor portion thereof projecting within said box, an insulating body extending axially within said tubular member, said body having an axial groove on its exterior, said tubular member having a lug disposed in said body groove to prevent rotation of the body, said body having a pair of spaced axial bores therein to receive house wires, said body having a head portion thereon disposed within said box, said head portion having clips mounted thereon with a portion thereof projecting into each of said bores to grip the end of the house wires disposed therein, an insulating cap section proportioned to fit around said head portion of said body, a lamp socket mounted in said box having a pair of wires connected thereto, a pair of spaced metal contact members extending through the wall of said cap section, said contact members adapted to be aligned with said clips and bear against said clips in response to rotary movement of the cap on said head, said lamp socket wires being connected to said metal contact members carried by the cap, and means to lock said cap to the head portion of said body and to said tubular member.

9. In a recessed lighting fixture, a box having a wall, said wall having an opening therein, a lamp socket mounted in said box having a pair of wires connected thereto, a metal sleeve mounted in said opening with the major portion thereof projecting exteriorly of the box and a minor portion thereof projecting into the interior of said box, an insulating body proportioned to fit within said sleeve and having an axial extent substantially equal to the length of the sleeve, said insulating body projecting into said box beyond said sleeve, a pair of axial bores through said insulating member to receive house wires, means on said insulating body to connect said house wires to said lamp socket wires, and means to lock the insulating body to said sleeve.

10. In a recessed lighting fixture, a box having a wall, said wall having an opening therein, a lamp socket mounted in said box having a pair of wires connected thereto, a metal sleeve mounted in said opening, an insulating body having a shank proportioned to fit within said sleeve and having a head within said box of greater diameter than the sleeve, a pair of axial bores through said insulating member to receive house wires, means on the head of said insulating body to connect said house wires to said lamp socket wires, and means to secure the insulating body to said sleeve.

11. In a recessed lighting fixture, a box having an opening in a side wall thereof, a lamp socket mounted within said box and having a pair of wires connected to said socket, a tubular sleeve leading into said box through said opening, an insulating body having a shank section and a head section within said box said shank section being proportioned to fit within said sleeve and the head section having a greater diameter than the shank section to limit the movement of the insulating body into the sleeve, said insulating body having a pair of spaced axial bores throughout its length to receive house wires, means fixed to said head section of said body to hold the ends of said house wires carried within said bores, means carried by said head section to connect said lamp socket wires to said house wires, and means to lock the body section to said sleeve.

12. In a recessed lighting fixture, a box having a side wall opening, a lamp socket mounted within said box and having a pair of wires connected to said socket, a house wire conduit mounted in said opening, house wires in the conduit, an insulating body having a shank section and a head section within said box said shank section being proportioned to fit within said conduit and the head section having a greater diameter than the shank section to limit the movement of the insulating body into the conduit, said insulating body having a pair of spaced axial bores throughout its length to receive said house wires, means carried by said head section of said body to secure the ends of said house wires carried within said bores to said lamp socket wires, and means to secure the body section to said conduit.

References Cited in the file of this patent

UNITED STATES PATENTS

| | | |
|---|---|---|
| 1,181,882 | Hawthorne | May 2, 1916 |
| 1,897,797 | Godley | Feb. 14, 1933 |
| 1,932,265 | Douglas | Oct. 24, 1933 |
| 2,741,695 | Schockett | Apr. 10, 1956 |
| 2,802,096 | Isler | Aug. 6, 1957 |
| 2,890,436 | Bentley | June 9, 1959 |